Patented July 3, 1923.

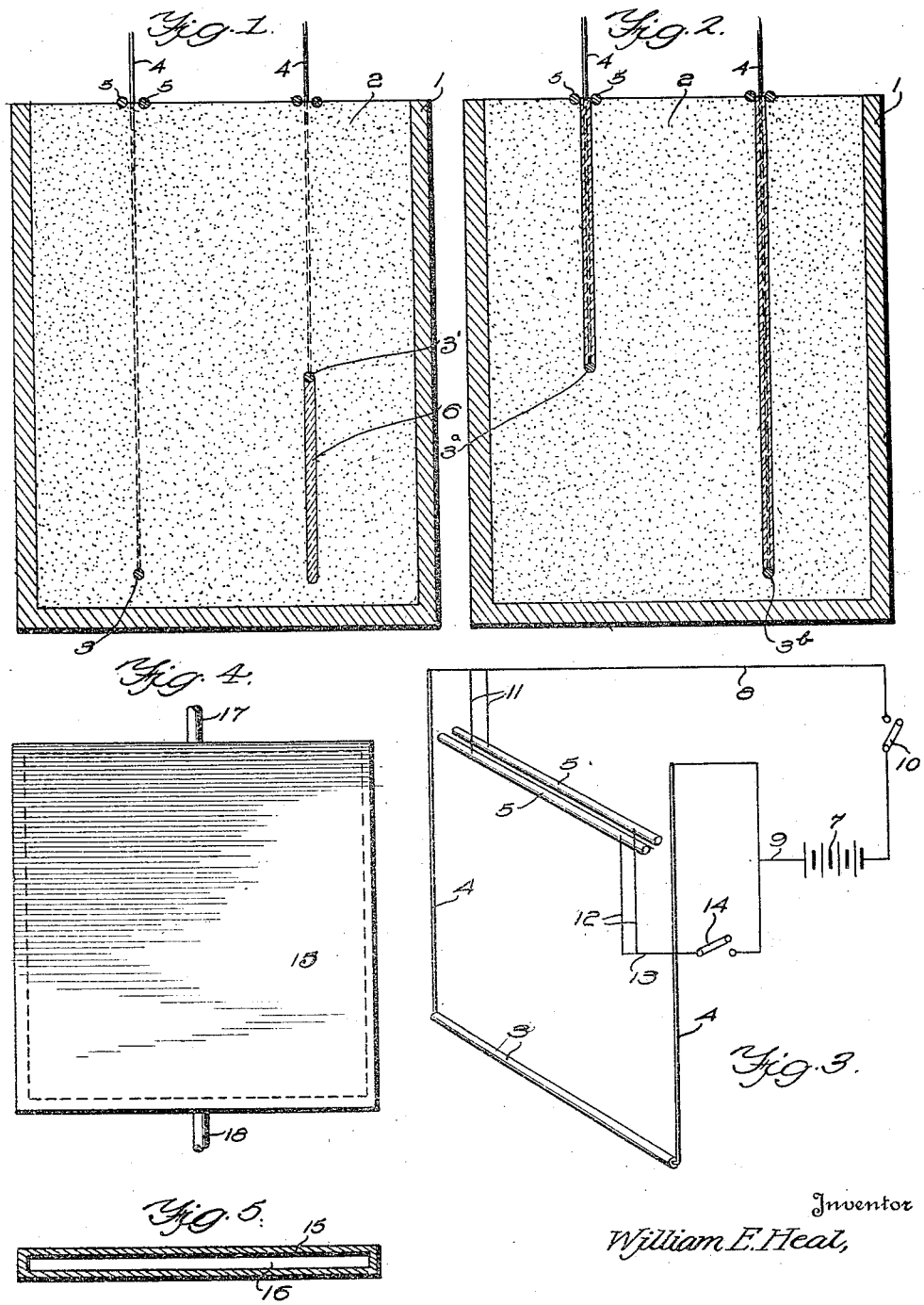

1,460,488

UNITED STATES PATENT OFFICE.

WILLIAM E. HEAL, OF WASHINGTON, DISTRICT OF COLUMBIA.

PROCESS OF AND APPARATUS FOR MAKING SHEET GLASS.

Application filed January 17, 1921. Serial No. 437,909.

*To all whom it may concern:*

Be it known that I, WILLIAM E. HEAL, a citizen of the United States, residing at Washington, in the District of Columbia, have invented certain new and useful Improvements in Processes of and Apparatus for Making Sheet Glass, of which the following is a specification.

This invention relates to processes of and apparatus for making sheet glass, and it comprises a method wherein finished and cooled glass is reduced to a fine and uniformly powdered condition, the powdered glass being then fused and allowed to cool slowly, and it further comprises an apparatus including a receptacle for powdered glass, a rod of infusible metal embedded in the glass in said receptacle, means for heating said rod, means for moving said rod through the body of glass, and means for removing the surface of the sheet of glass formed.

In the present process, finished glass in a uniformly powdered condition is heated to reduce it to a plastic or molten condition and allowed to fuse. The sheet glass so formed is then cooled and the surface polished to produce a "fire polish." In one form of the invention, the powdered glass is arranged on a plate or table constructed of copper or other material permitting of a high polish and placed in a furnace or chamber to permit fusing of the powdered glass. The plate may be constructed to permit a circulation of water beneath the surface for cooling purposes. The glass to be fused may be arranged on the plate at any desired thickness and heating continued until the entire body of glass is properly fused.

In another form of the invention, the powdered glass is arranged in a receptacle, and a rod of tantalum, tungsten, molybdenum, or other highly infusible metal is embedded therein. This rod is connected in an electric circuit, whereby it may be heated to fuse the glass in the immediate vicinity. The rod is slowly raised or elevated through a body of powdered glass, fusing it during its ascent and forming a sheet.

In the accompanying drawings, I have shown several forms of apparatus particularly suited for use in practicing the process. In this showing:

Figure 1 is a vertical sectional view of one form of apparatus, wherein the glass is formed by moving a heated rod upwardly, Figure 2 is a similar view showing a method of forming sheet glass by moving the rod downwardly, Figure 3 is a diagrammatic illustration of the electric circuits employed in practicing the process, Figure 4 is a plan view of another form of apparatus capable of use in performing the process, and, Figure 5 is a sectional view thereof.

Referring to the drawings, the reference numeral 1 designates a heating receptacle made of suitable material and adapted to receive a body 2 of finely divided, powdered glass. The glass employed in practicing the process is finished and cooled glass, usually called cullet. A rod 3 of tungsten, tantalum, or molybdenum, is embedded in the body of powdered glass and suitable electrical connections 4 are arranged at each end of the rod. At the top of the tank, a pair of cross rods 5 of similar infusible material are arranged. The reference numeral 3' represents a rod which has been heated and partly raised forming a sheet of glass 6. In Figure 2 of the drawings, the apparatus employed is the same as in Figure 1. In practicing the process, as shown in Figure 2 of the drawings, the rods 3 are arranged at the top of the tank and lowered. The reference numeral 3ª represents a rod that has been partially lowered, and the reference numeral 3ᵇ, a rod that has been lowered to a point near the bottom of the tank.

Referring to Figure 3 of the drawings, a source of current 7 is connected to the connections 4 by means of wires 8 and 9. Suitable controlling means, such as a switch 10, may be arranged in one of the wires. The polishing rods 5 are connected to the wire 8 by means of branch wires 11, and to the wire 9 by means of branch wires 12, and wire 13. A suitable switch 14 may be arranged in one of the branch wires, or in the wire 13, as shown.

Referring to Figures 4 and 5 of the drawings, the apparatus therein illustrated comprises a hollow plate or table 15, on which the powdered glass is spread. The plate is provided with a water space 16, and with an inlet 17 and an outlet 18, as shown.

In practicing the process, with the apparatus shown in Figures 1 to 3 of the drawings, according to the method disclosed in Figure 1, the rod 3 is first embedded in a body of uniformly powdered, finished glass, and the switch 10 closed. Current then passes from the source of current 7 through the lead wire 8 and connections 4, to the rod 3, and returns to the source through the connection 4 and lead wire 9. When the rod has been heated to the desired temperature, the glass in the immediate vicinity is fused and the rod is then slowly elevated, fusing the powdered glass into a sheet, as it rises, as indicated at 6. After the fusing rod has reached the top of the body of powdered glass, it is removed, and the sheet so formed is allowed to cool. Cooling takes place slowly on account of the surrounding body of non-conducting glass powder. The sheet of glass so formed has a slightly roughened surface on both sides and to remove this, it is drawn upwardly between the rods 5, the switch 14 having been closed to complete the circuit and heat the rods. A thin skin is thus melted off each side of the sheet as it is removed from the chamber, and a brilliant surface referred to in the art as "fire polish" is produced. By suitably regulating the speed of fusion or the speed at which the rod 3 is elevated, sheets of any desired thickness may be formed.

In practicing the process according to the showing in Figure 2 of the drawings, the rod 3 is first arranged at the top of the tank and heated. When the desired temperature to cause fusion of the powdered glass is reached, the rod is moved downwardly fusing a sheet in the manner heretofore described. The operation is otherwise the same as described in connection with Figure 1 of the drawings.

Referring to Figures 4 and 5 of the drawings, when the plate 15 is used, the powdered glass is spread on it to the desired thickness, and it is placed in an oven or other chamber and heated to a temperature sufficiently high to reduce the powdered glass to a plastic or molten condition and fuse it. After the sheet of glass has been fused, it may be cooled in any suitable manner, as by subjecting it to the temperature of the atmosphere. Water may be passed through the space 16 to prevent the glass from adhering to the surface of the plate.

It is obvious that glass of different qualities and having different densities and different melting points may be spread on the plate in successive layers, and thus the complete sheet may be made to have different degrees of hardness, toughness, brilliancy, and other qualities, as desired.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described my invention, I claim:

1. A method of forming sheet glass which comprises passing a highly heated member through a body of powdered, finished glass whereby the powdered glass in the path of the member is fused, and allowing the fused glass to remain in said body until it cools.

2. A method of forming sheet glass which comprises passing a highly heated member through a body of powdered, finished glass whereby the powdered glass in the path of the member is fused, allowing the fused glass to cool in said body, and then removing it.

3. A method of forming sheet glass which comprises passing a highly heated member through a body of powdered, finished glass whereby the powdered glass in the path of the member is fused, allowing the fused glass to cool in said body, and heating the surface of the glass to a fusing temperature while removing.

4. An apparatus for forming sheet glass comprising a receptacle adapted to receive a body of powdered, finished glass, a movable member of infusible metal adapted to be embedded in the body of glass within said receptacle, and means for heating said member.

5. An apparatus for forming sheet glass comprising a receptacle adapted to receive a body of powdered, finished glass, a rod of infusible metal adapted to be arranged in said receptacle within said body of glass, means for moving said rod, and means for heating said rod.

6. An apparatus for forming sheet glass comprising a receptacle adapted to receive a body of powdered, finished glass, a movable rod of infusible metal arranged in said receptacle and adapted to be embedded within the powdered glass, and electrical connections to said rod whereby it may be heated.

7. An apparatus for forming sheet glass comprising a receptacle adapted to receive a body of powdered, finished glass, a movable member arranged therein, means for heating said member, and a pair of spaced rods arranged at the top of said tank, said rods being capable of being heated for polishing the sheet glass formed.

In testimony whereof I affix my signature in presence of two witnesses.

WILLIAM E. HEAL.

Witnesses:
 RUTH HOLMES,
 THOS. P. HICKMAN.